United States Patent
Akkarakaran et al.

(10) Patent No.: US 11,751,095 B2
(45) Date of Patent: *Sep. 5, 2023

(54) TRANSMISSION OF BUFFER STATUS REPORTS ON MULTIPLE COMPONENT CARRIERS

(71) Applicant: QUALCOMM Incorporated, San Diego, CA (US)

(72) Inventors: Sony Akkarakaran, Poway, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/548,152

(22) Filed: Dec. 10, 2021

(65) Prior Publication Data

US 2022/0104063 A1 Mar. 31, 2022

Related U.S. Application Data

(63) Continuation of application No. 16/811,897, filed on Mar. 6, 2020, now Pat. No. 11,496,922, which is a (Continued)

(51) Int. Cl.
*H04L 5/00* (2006.01)
*H04W 8/24* (2009.01)
(Continued)

(52) U.S. Cl.
CPC ......... *H04W 28/0278* (2013.01); *H04L 5/001* (2013.01); *H04L 5/0048* (2013.01);
(Continued)

(58) Field of Classification Search
CPC ............ H04B 7/02–12; H04J 1/06–085; H04J 2011/0096; H04L 5/0001–26;
(Continued)

(56) References Cited

U.S. PATENT DOCUMENTS 10,588,047 B2 * 3/2020 Akkarakaran .... H04W 28/0278
11,496,922 B2 * 11/2022 Akkarakaran .... H04W 28/0278
(Continued)

FOREIGN PATENT DOCUMENTS

CN 101877911 A 11/2010
CN 101932019 A 12/2010
(Continued)

OTHER PUBLICATIONS

European Search Report—EP22163984—Search Authority—The Hague—dated Jun. 20, 2022.
(Continued)

*Primary Examiner* — Timothy J Weidner
(74) *Attorney, Agent, or Firm* — Arent Fox, LLP

(57) ABSTRACT

The present disclosure generally relates to a methods, apparatus, and computer readable medium for implementing the methods for transmitting multi-bit SR (SRs) from a user equipment (UE). The UE receive from a base station a radio resource control (RRC) message from the base station. The RRC message may indicate that uplink component carriers (CCs) of the UE are to be assigned to a plurality of uplink CC groups. Upon receipt of the RRC, the UE may assign the uplink CCs to the plurality of uplink CC groups. A multi-bit SR may be generated for each group of the plurality of uplink CC groups. The UE may transmit the multi-bit SR generated for each group of the plurality of uplink CC groups to the base station. multi-bit SR transmission across different CCs may reduce latency in uplink grant and improve data transmission time.

28 Claims, 6 Drawing Sheets

Related U.S. Application Data continuation of application No. 15/941,682, filed on Mar. 30, 2018, now Pat. No. 10,588,047.

(60) Provisional application No. 62/483,904, filed on Apr. 10, 2017.

(51) Int. Cl.

| | | |
|---|---|---|
| *H04W 24/10* | (2009.01) | |
| *H04W 28/02* | (2009.01) | |
| *H04W 72/04* | (2023.01) | |
| *H04W 72/12* | (2023.01) | |
| *H04W 76/27* | (2018.01) | |
| *H04W 84/02* | (2009.01) | |
| *H04W 88/02* | (2009.01) | |
| *H04W 88/08* | (2009.01) | |
| *H04W 92/02* | (2009.01) | |
| *H04W 92/10* | (2009.01) | |
| *H04W 72/21* | (2023.01) | |
| *H04W 72/23* | (2023.01) | |

(52) U.S. Cl.
CPC .......... *H04L 5/0053* (2013.01); *H04L 5/0096* (2013.01); *H04W 8/24* (2013.01); *H04W 24/10* (2013.01); *H04W 28/0205* (2013.01); *H04W 72/21* (2023.01); *H04W 72/23* (2023.01); *H04W 76/27* (2018.02); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC . H04W 4/70; H04W 8/18–245; H04W 24/10; H04W 28/02–12; H04W 48/02–20; H04W 72/005–14; H04W 74/002–06; H04W 76/10–40; H04W 92/10
See application file for complete search history.

(56) References Cited

U.S. PATENT DOCUMENTS

| | | |
|---|---|---|
| 2011/0194516 A1 | 8/2011 | Aiba et al. |
| 2012/0113914 A1 | 5/2012 | Zhao et al. |
| 2012/0134305 A1 | 5/2012 | Damnjanovic et al. |
| 2017/0048857 A1 | 2/2017 | Vajapeyam et al. |
| 2017/0086219 A1 | 3/2017 | Lee et al. |
| 2018/0049227 A1 | 2/2018 | Moon et al. |
| 2020/0229027 A1 | 7/2020 | Akkarakaran |

FOREIGN PATENT DOCUMENTS

| | | |
|---|---|---|
| CN | 102111751 A | 6/2011 |
| CN | 102415187 A | 4/2012 |
| CN | 103249090 A | 8/2013 |
| CN | 106068670 A | 11/2016 |
| WO | 2016010227 A1 | 1/2016 |
| WO | 2016183728 A1 | 11/2016 |

OTHER PUBLICATIONS

Chuang T-H., et al., "Group-Based Uplink Scheduling for Machine-Type Communications in LTE-Advanced Networks", 2015 IEEE 29th International Conference on Advanced Information Networking and Applications Workshops, IEEE, Mar. 24, 2015, XP032771569, DOI: 10.1109/WAINA.2015.54 [retrieved on Apr. 27, 2015], pp. 652-657.
ETRI: "Uplink Scheduling for Multiple Numerologies", 3GPP Draft; R2-1703152, 3GPP TSG-RAN WG2 Meeting #97bis, UL Scheduling, 3rd Generation Partnership Project (3GPP), Mobile Competence Centre; 650, Route Des Lucioles; F-06921 Sophia-Antipolis Cedex; France, vol. RAN WG2 Meeting #97bis, No. Spokane, USA; Apr. 3, 2017-Apr. 7, 2017, Apr. 3, 2017, XP051245086, Retrieved from the Internet: URL:http://www.3gpp.org/ftp/Meetings_3GPP_SYNC/RAN2/Docs/ [retrieved on Apr. 3, 2017), 3 pages.
European Search Report—EP21203748—Search Authority—The Hague—dated Jan. 4, 2022.
International Search Report and Written Opinion—PCT/US2018/025713—ISA/EPO—dated Jun. 28, 2018.
Qualcomm Incorporated: "Enhanced SR and BSR", 3GPP Draft; V07 Final R2-170XXXX Enhanced SR and BSR, 3rd Generation Partnership Project (3GPP), Mobile Competence Centre; 650, Route Des Lucioles; F-06921 Sophia-Antipolis Cedex; France, vol. RAN WG2, No. Spoken, USA; Apr. 3, 2017-Apr. 7, 2017 Apr. 3, 2017, XP051245574, Retrieved from the Internet: URL:http://www.3gpp.org/ftp/Meetings_3GPP_SYNC/RAN2/Docs/ [retrieved on Apr. 3, 2017), 4 pages.

\* cited by examiner

TRANSMISSION OF BUFFER STATUS REPORTS ON MULTIPLE COMPONENT CARRIERS

CROSS-REFERENCE TO RELATED APPLICATION

This application is a Continuation of application Ser. No. 16/811,897 entitled "Transmission of Buffer Status on Multiple Component Carriers," filed Mar. 6, 2020, Continuation of application Ser. No. 15/941,682 entitled "Transmission of Buffer Status on Multiple Component Carriers," filed Mar. 30, 2018, which claims priority to, and the benefit of, Provisional Application No. 62/483,904 entitled "Transmission of Buffer Status on Multiple Component Carriers," filed Apr. 10, 2017, and the contents of which are hereby incorporated herein by reference in their entireties.

BACKGROUND

Aspects of the present disclosure relate generally to wireless communication networks, and more particularly, to transmission of buffers status reports (BSRs) in wireless communication networks.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, the current size of scheduling requests (SRs), e.g., 1 bit, and BSRs, e.g., 8 bits (short BSR) or 24 bits (long BSR), may not provide the desired level of speed or efficiency for BSR signaling. Thus, improvements in SR/BSR transmissions may be desired.

SUMMARY OF THE INVENTION

The following presents a simplified summary of one or more aspects to provide a basic understanding of such aspects. This summary is not an extensive overview of all contemplated aspects, and is intended to neither identify key or critical elements of all aspects nor delineate any aspects. Its sole purpose is to present concepts of one or more aspects in a simplified form as a prelude to the more detailed description presented later.

In an aspect, the present disclosure includes a method, an apparatus, and a computer-readable medium for wireless communications. The example method may receive, at the UE, a radio resource control (RRC) message from a base station, wherein the RRC message indicates that uplink component carriers (CCs) of the UE are to be assigned to a plurality of uplink CC groups. The example method may assign the uplink CCs to the plurality of uplink CC groups. The example method may generate, at the UE, a multi-bit SR for each group of the plurality of uplink CC groups. The example method may transmit, from the UE, the multi-bit SR generated for each group of the plurality of uplink CC groups to the base station.

In an additional aspect, the present disclosure includes a method, an apparatus, and a computer-readable medium for wireless communications. The example method may receive, at the UE, a RRC message from a base station, wherein the RRC message indicates that the multi-bit SR is to be jointly scheduled across a plurality of uplink CCs. The example method may generate, at the UE, the multi-bit SR based at least on the RRC message received from the base station. The example method may transmit, from the UE, the multi-bit SR on each uplink CC of the plurality of the uplink CCs.

In a further aspect, the present disclosure includes a method, an apparatus, and a computer-readable medium for wireless communications. The example method may receive, at the UE, a RRC message from a base station, wherein the RRC message indicates that uplink CCs of the UE are to be assigned to a plurality of uplink CC groups, and that a multi-bit SR of a CC group is to be jointly scheduled across a plurality of CCs of the respective CC group. The example method may generate, at the UE, a multi-bit SR for each group of the plurality of uplink CC groups, wherein a multi-bit SR that is generated for a uplink CC group includes a plurality of bits, wherein the multi-bit SR includes a first and a second part, and wherein the multi-bit SR is jointly scheduled across a sub-set of the uplink CCs associated with the corresponding uplink CC group. The example method may transmit, from the UE, the multi-bit SRs generated for each group to a base station.

The present disclosure also includes an apparatus having components or configured to execute or means for executing the above-described methods. The present disclosure also includes a computer-readable medium storing one or more codes executable by a processor to perform the above-described methods.

To the accomplishment of the foregoing and related ends, the one or more aspects comprise the features described and particularly pointed out in the claims. This description and the annexed drawings set forth in detail certain illustrative features of the one or more aspects. These features are indicative, however, of but a few of the ways in which the principles of various aspects may be employed, and this description should include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
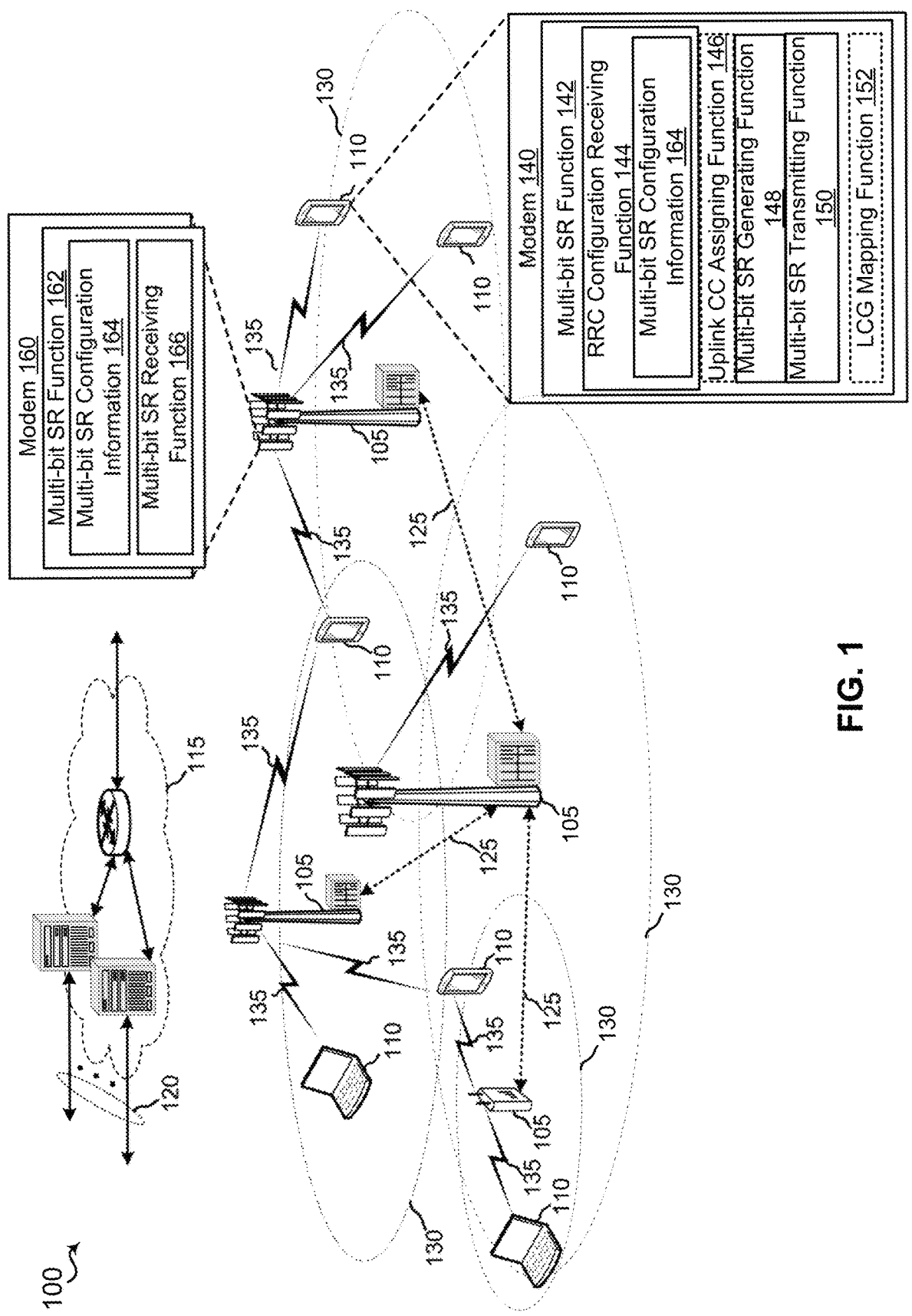
FIG. 1 is a schematic diagram of a wireless communication network including at least one base station having a BSR function for receiving BSRs and at least one UE for transmitting BSRs according to this disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, terms "function" or "component" as used herein may be one of the parts that make up a system, may be hardware, firmware, and/or software stored on a computer-readable medium, and may be divided into other functions/components.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G and 5G New Radio networks or other next generation communication systems).

The present disclosure generally relates to a methods, apparatus, and computer readable medium for implementing the methods for transmitting multi-bit SR (SRs) from a user equipment (UE). The UE receives a radio resource control (RRC) message from a base station. The RRC message may indicate that uplink component carriers (CCs) of the UE are to be assigned to a plurality of uplink CC groups. Upon receipt of the RRC, the UE may assign the uplink CCs to the plurality of uplink CC groups. A multi-bit SR may be generated for each group of the plurality of uplink CC groups. The UE may transmit the multi-bit SR generated for each group of the plurality of uplink CC groups to the base station. The generated multi-bit SR may include one or more bits.

In some aspects, the UE may map each logical channel group (LCG) of a plurality of LCGs at the UE to an uplink CC of the plurality of uplink CCs. The map is updated in a semi-static or a dynamic manner. For example, the mapping may be updated in the semi-static manner via a second RRC message. In another example the mapping may be updated in the semi-static manner, and the updating may be based on a scheduler load associated with a corresponding uplink CC. In an another example, the mapping may be updated in the dynamic manner when all physical uplink control channel (PUCCH)/physical uplink shared channel (PUSCH) transmissions are scheduled by one downlink control information (DCI).

In an aspect, the plurality of uplink CC groups may include a first uplink CC group and a second uplink CC group. Further, generating the multi-bit SR for each group includes generating a first multi-bit SR for the first uplink CC group and a second multi-bit SR for the second uplink CC group, and wherein a first number of bits of the first multi-bit SR is different from a second number of bits of the second multi-bit SR. Such aspects may further include, dynamically updating, at the UE, a number of bits of a multi-bit SR. The updating may be based on one or more of an assigned PUCCH, a PUCCH format, a PUCCH assignment size, or types or sizes of other uplink control information (UCI) payloads multiplexed together with the multi-bit SR on PUCCH.

In some aspects, the size of the multi-bit SR is represented by the function $X=\mathrm{ceil}(\log2(K+1))$ in which K is a number of physical uplink control channel (PUCCH) resources and X is a number of SR bits. The K PUCCH resources are ordered in increasing size of corresponding SR resources and wherein the index of an ordered PUCCH resource ID is obtained from X bits when SR is triggered. Further, the formula applies when UCI transmitted by a UE on a PUCCH in a slot using specific PUCCH formats (e.g., 2, 3, or 4) overlaps in time with K configured PUCCH resources that overlap in time.

Other aspects of the present disclosure generally relates to a methods, apparatus, and computer readable medium for implementing the methods for transmitting a multi-bit SR from a UE. The UE may receive a radio RRC message from a base station, in which the RRC message indicates that the multi-bit SR is to be jointly scheduled across a plurality of uplink CCs. The UE may generate, the BSR based at least on the RRC message received from the base station and may transmit the multi-bit SR on each uplink CC of the plurality of the uplink CCs.

In some aspects, the multi-bit SR may include a first part and a second part. The transmitting includes transmitting the first part on each uplink CC of the plurality of the uplink CCs and the second part on a sub-set of the plurality of the uplink CCs. In such aspects, the multi-bit SR transmitted on each PUCCH or PUSCH on each uplink CC is self-decodable.

In some aspects, parameters for the configuration may be received in a single DCI grant. In other aspects, most significant bits (MSBs) are transmitted on more reliable CCs and least significant bits (LSBs) are carried on less reliable CCs.

Further aspects present disclosure generally relates to a methods, apparatus, and computer readable medium for implementing the methods for transmitting BSRs from a UE. The UE receiving, at the UE, a RRC message from a base station. The RRC message may indicate that uplink CCs of the UE are to be assigned to a plurality of uplink CC groups, and that a multi-bit SR of a CC group is to be jointly scheduled across a plurality of CCs of the respective CC group. A BSR may be generated for each group of the plurality of uplink CC groups. Any BSR that is generated for an uplink CC group may include a plurality of bits, wherein the BSR includes a first and a second part, and wherein the multi-bit SR is jointly scheduled across a sub-set of the uplink CCs associated with the corresponding uplink CC group. The UE may transmit the multi-bit SRs generated for each group to a base station.

In general, in LTE, the SR is a single bit, carried on PUCCH/PUSCH of one uplink (UL) component carrier. These SR bits may be determined on a per UE basis rather than per component carrier. The transmission of multi-bit SRs to a base station may require that an SR be sent via PUCCH/PUSCH and that a subsequent transmission be sent carrying the multi-bit SR.

Dual connectivity frameworks may enable independent SRs to be transmitted by the UE on independent PUCCH/PUSCH for the different "connections" (cell groups), because each connection is scheduled independently. In 5G new radio (NR), the SR may be one or more bit and may include some or all bits of SR. The implementation of BSR may enable faster BSR signaling, without first having to send SR on PUCCH and then follow up with BSR in a medium access control-control element (MAC-CE) with PUSCH.

Further, the various aspects provide techniques for SR/BSR transmission over multiple component carriers using logic channel groups. By coordinating parallel transmission of SR/BSR across multiple component carriers in the same slot, the various aspects may improve the efficiency and timeliness of SR and/or BSR communication between a UE and a base station. Because the BSR is used to inform the base station about the amount of data buffered in the UE's transmission queue so that the base station may properly allocate resources for receiving and routing the data, the reduced reporting time obtained by the BSR/SR transmission techniques of the present disclosure may reduce the time between transmission of scheduling requests and receipt of grants by the base station.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one UE 110 with a modem 140 that further includes a multi-bit SR function 142 for transmitting one or more multi-bits (e.g., SRs, BSRs, SR+BSR) from UE 110. In one aspect, multi-bit SR function 142 may include one or more of a RRC configuration function 144 to receive multi-bit SR configuration information 164 from base station 105. The multi-bit SR function 152 may include an uplink CC assigning function 146 to assign resources allocated in the RRC to uplink channels. The multi-bit function 142 may include a multi-bit SR generating function 148, a multi-bit SR transmitting function 150, and/or a logical channel group (LCG) mapping function 152 to transmit one or more multi-bit SRs to base station 105. In an additional aspect, the example wireless communication network 100 includes at least one base station 105 with a modem 160 that further includes a multi-bit SR function 162 for receiving one or more bits of SR (e.g., multiple SRs, BSR, or SR+BSR) from UE 110. For example, multi-bit SR function 162 may transmit multi-bit SR configuration information 164 to UE 110 and/or may include multi-bit SR receiving function 166 to receive one or more multi-bit SRs from UE 110 (e.g., SRs, BSR, and/or SR+BSR). In some aspects the multi-bit SR received may include multiple SR bits carried on different CC. In other aspects the SR bits may include both an SR and a corresponding BSR transmitted in parallel on different CCs.

In LTE, a UE sends a scheduling request (SR) to a base station which includes a single bit of information indicating whether the UE has data to transmit to the base station. After transmitting the SR to the base station, the UE may send a multi-bit SR to the base station.

The multi-bit SR and/or BSR may be a media access control (MAC) control element (MAC CE) which indicates the amount of data in the UE buffers that is scheduled to be sent out or transmitted. In response to receiving the multi-bit SR from the UE, the base station may allocate uplink grant resources, e.g., resources for PUSCH so that the UE can transmit at least some data in the UE buffers. In LTE, there are two types of BSRs, a short BSR and a long BSR. The short BSR is 8 bits in length, and informs the base station about the amount of data in a UE buffer (e.g., a uplink buffer) for a specific logical channel group (LCG) by including the LCG ID in the short BSR. The long BSR is 24 bits in length and includes the buffer sizes of all LCGs. However, the transmission of the SR followed by the BSR is not efficient, and/or size of the SR/BSRs is not sufficient to support faster and/or efficient signaling in NR. Thus in 5G NR, a UE 110 may transmit a multi-bit SR, which may include BSR. The BSR may be transmitted across multiple different LCG.

The present disclosure generally relates to transmitting one or more multi-bit SRs from a UE to a base station. In one aspect, the present disclosure recites an example method, an apparatus, and a computer readable medium for transmitting buffer status reports from a UE which may include receiving a RRC message from a base station, wherein the RRC message indicates that uplink CCs of the UE are to be assigned to a plurality of uplink CC groups. The example method further recites assigning the uplink CCs to the plurality of uplink CC groups, generating a multi-bit SR for each group of the plurality of uplink CC groups, and transmitting the multi-bit SR generated for each group of the plurality of uplink CC groups to the base station.

In an additional aspect, the present disclosure recites an example method, an apparatus, and a computer readable medium for transmitting a buffer status report from a UE which may include receiving a RRC message from the base station, wherein the RRC message indicates that the multi-bit SR is to be jointly scheduled across a plurality of uplink CCs. The example method further includes generating the multi-bit SR based at least on the RRC message received from the base station and transmitting the multi-bit SR on each uplink CC of the plurality of the uplink CCs.

In a further additional aspect, the present disclosure recites an example method, an apparatus, and a computer readable medium for transmitting buffer status reports from a UE which may include receiving a RRC message from the base station, wherein the RRC message indicates that uplink CCs of the UE are to be assigned to a plurality of uplink CC groups, and that a multi-bit SR of a CC group is to be jointly scheduled across a plurality of CCs of the respective CC group. The example method further includes generating a multi-bit SR for each group of the plurality of uplink CC groups, wherein the multi-bit SR includes a first and a second part, and wherein the multi-bit SR is jointly scheduled across a sub-set of the uplink CCs associated with the corresponding uplink CC group, and transmitting, from the UE, the multi-bit SRs generated for each group to the base station.

Referring again to FIG. 1, the wireless communication network 100 may include one or more base stations or base stations 105, one or more UEs 110, and a core network 115. The core network 115 may provide user authentication, access authorization, tracking, interne protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNB, Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of station may provide coverage for various geographical regions. For example, each eNB, gNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). A base station for a macro cell may be referred to as a macro eNB/gNB. A base station for a small cell may be referred to as a small cell eNB/gNB, a pico eNB/gNB, a femto eNB/gNB, or a home eNB/gNB. A eNB/gNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary and/or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs 110. A UE 110 may be able to communicate with various types of base stations 105 and network equipment including macro eNBs/gNBs, small cell eNBs/gNBs, macro eNBs/gNBs, small cell eNBs/gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bi-directional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or a listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 2:
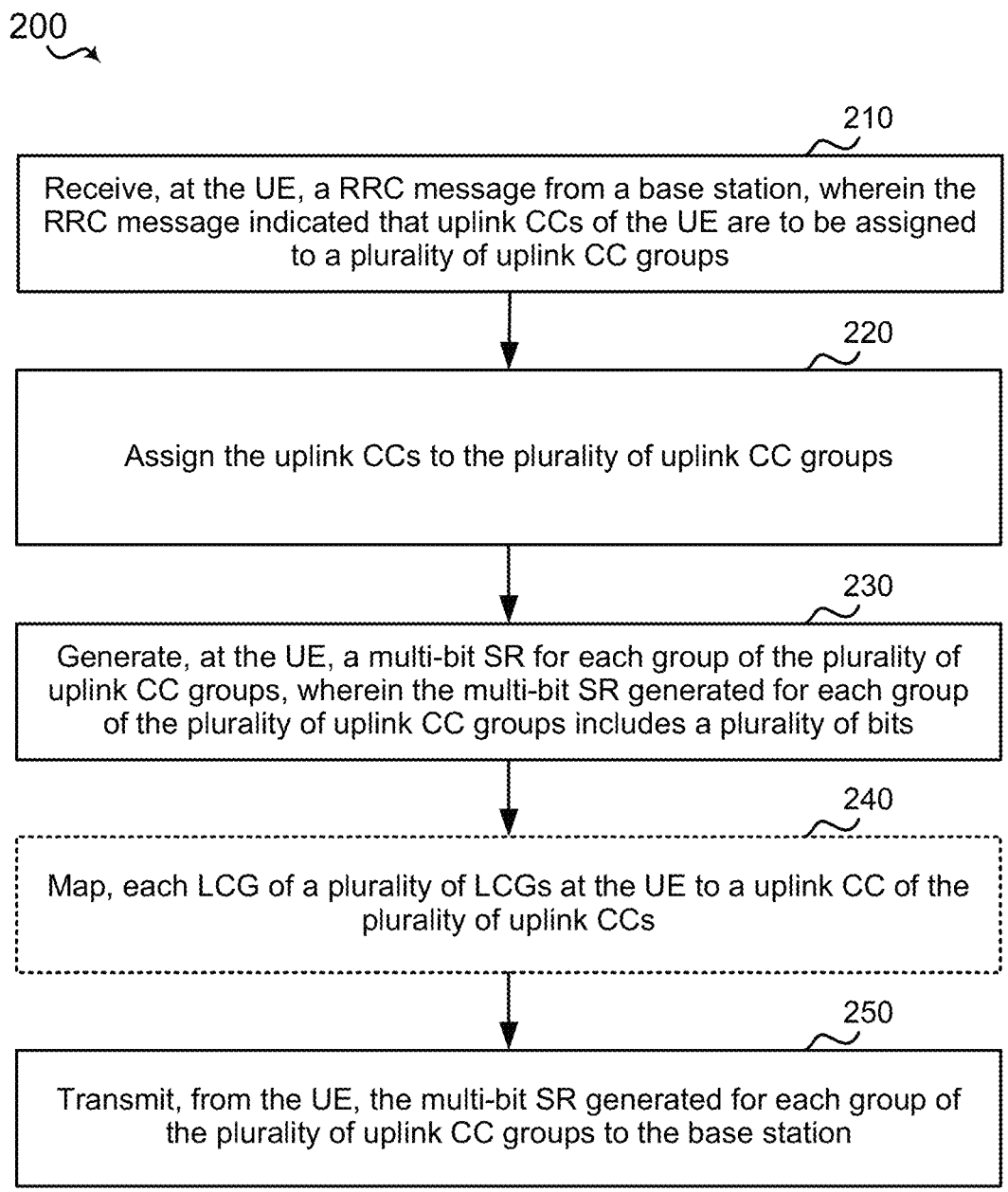
FIG. 2 is a process flow diagram of a method for transmitting multi-bit SR according to the present disclosure

FIG. 2 illustrates a flowchart of a method 200 for transmitting multi-bit SRs (e.g., multiple SR and/or BSR bits) from a UE according to aspects of the present disclosure.

In an aspect, at block 210, methodology 200 may include receiving, at the UE 110, a RRC message from a base station, wherein the RRC message indicates that uplink component carriers (CCs) of the UE are to be assigned to a plurality of uplink CC groups. For example, in an aspect, UE 110 and/or multi-bit SR function 142 may include a RRC configuration receiving function 144, such as a specially programmed processor module, or a processor executing specially programmed code stored in a memory to receive multi-bit SR configuration information 164 from base station 105. Multi-bit SR configuration information 164 received from base station 105 may indicate to UE 110 the configuration of uplink CCs at UE 110. For example, multi-bit SR configuration information 164 received at UE 110 may indicate to UE 110 that the uplink CCs (also referred to as CCs in the present disclosure) at UE 110 are to be assigned to a plurality of uplink CC groups (also referred to as CC groups in the present disclosure). In other words, multi-bit SR configuration information 164 received from base station 105 indicates to UE 110 that UE 110 should divide the uplink CCs into a plurality of uplink CC groups, e.g., CC Group1 and CC Group2.

In an aspect, at block 220, methodology 200 may include assigning the uplink CCs to the plurality of uplink CC groups. For example, in an aspect, UE 110 and/or multi-bit SR function 150 may include a uplink CC assigning function 146, such as a specially programmed processor module, or a processor executing specially programmed code stored in a memory to assign the uplink CCs to the plurality of uplink CC groups. For example, UE 110 may be configured with a plurality of uplink CCs, e.g., CC1, CC2, CC3, CC4, and/or CC5. In an aspect, uplink CC assigning function 146, based on information received in multi-bit SR configuration information 164 from base station 105, may assign uplink CC1, CC2, and/or CC3 to CC Group1, and CC4 and/or CC5 (265) to CC Group2.

Further, at block 230, method 200 may include generating, at the UE, multi-bit SR for each group of the plurality of uplink CC groups, wherein the generated multi-bit SR includes a plurality of bits. For example, in an aspect, UE 110 and/or multi-bit SR function 142 may include a multi-bit SR generating function 148, such as a specially programmed processor module, or a processor executing specially programmed code stored in a memory to generate one or more SR, BSR, and/or an SR+BSR for each group of the plurality of uplink CC groups. For instance, UE 110 may generate a BSR for CC Group1 and/or a BSR for CC Group 2. The BSRs, generated at UE 110 may support multiple bits. That is, BSRs may be configured to carry a plurality of bits to support the faster BSR signaling needed for NR. However, in an aspect, a multi-bit SR may include a BSR configured to carry 1 bit which may indicate whether UE 110 has data to transmit to base station 105. The configuration of a BSR to carry 1 bit may be considered as configuring the BSR to carry information which indicates whether the UE has new data to transmit to base station 105, similar to a SR in LTE.

In an additional aspect, the length of a multi-bit SR configured/generated for one group of uplink CCs may be different from the length of a BSR configured/generated for another group of uplink CCs. For example, the length of bits of a first multi-bit SR may be different from the length of a second BSR. That is, there is no restriction that the BSRs generated should be equal in size. Further, the length of a BSRs may be defined/configured based on one or more of an assigned PUCCH, a PUCCH format, a PUCCH assignment size, or types or sizes of other uplink control information (UCI) payloads multiplexed together with the BSR on a PUCCH. Moreover, the length of a BSR may be dynamically updated (e.g., changed, modified, etc.) based on one or more of the parameters listed above. For example, larger PUCCH assignment sizes or PUCCH formats supporting larger payload sizes may support larger number of BSR bits.

UE 110 may send/transmit a BSR generated at UE 110 to base station 105 in a PUCCH/PUSCH of a uplink CC of the respective group. For example, a first BSR of a BSR may be sent in in a PUCCH/PUSCH of CC1, CC2, and/or CC3, and a second BSR may be sent in in a PUCCH/PUSCH of CC4 and/or CC5.

In various aspects, if UCI transmitted by a UE 110 on a PUCCH in a slot of format 2, 3, or 4 overlaps in time with K configured PUCCH SR resources that overlap in time, then X bits are used to represent an SR to be transmitted by the UE 110. The size of the BSR may thus be represented by the function:

$$X = \text{ceil}(\log_2(K+1))$$

In which K is the number of configured SR PUCCH IDs that overlap in time with the UCI transmission on PUCCH in the slot. The K IDs are ordered according to an increasing number of the corresponding SR IDs. The index of an ordered configured PUCCH resource ID is obtained from X bits when SR is triggered.

An all-zero X may represent the absence of an SR. Otherwise, X represents the presence of an SR. The X bits may be considered when the UCI is encoded irrespective of whether the SR is present or absent.

Optionally, at block 240, method 200 may include mapping each logical channel group (LCG) of a plurality of LCGs at the UE to a uplink CC of the plurality of uplink CCs. For example, in an aspect, UE 110 and/or multi-bit SR function 142 may include a logical channel group (LCG) assigning function 152, such as a specially programmed processor module, or a processor executing specially programmed code stored in a memory to map each LCG of a plurality of LCGs to a uplink CC of the plurality of uplink CCs. The mapping of a logical channel (or a radio bearer) to a LCG may be performed at radio bearer setup time based on type of traffic, quality of service (QoS) attributes, etc. For example, logical channels carrying file transfer protocol (FTP) traffic may be assigned to one LCG, logical channels carrying web browsing traffic may be assigned to another LCG and so on. In one aspect, there may be four LCGs (0-3). In an additional aspect, the number of LCGs may be defined by base station 105.

For example, in an aspect, LCG0 and LCG1 may be respectively assigned to CC1 and CC2 of Group1, and LCG2 and LCG3 may be respectively assigned to CC4 and CC5 of Group2. The allocation of a LCG to a CC may be based on a scheduler load, e.g., load on the specific. For instance, LCG1 may be assigned to CC1 if CC1 is not heavily loaded (not that much data on CC1 for transmission).

Additionally, the mapping of a LCG to a CC may be updated in a semi-static or a dynamic manner. For instance, if CC1 is heavily loaded due to the amount of data assigned to CC1 for transmission to base station 105. The base station 105 may determine this based on channel state information (CSI) reports received from UE 110. The base station 105 may semi-statically update the mapping of LCG0 from CC1 to CC3 by sending a RRC message to UE 110 to update (e.g., modify, re-configures, etc.) the mapping. In an aspect, base station 105 may send the updating mapping via a RRC message as the RRC message is more reliable (e.g., due to HARQ protocol) and UE 110 may use the updated mapping only upon receiving of the updated mapping and transmission of a HARQ acknowledgement to base station 105. This ensures both base station 105 and UE 110 are in sync regarding the LCG mapping. In an additional or optional aspect, the mapping may be updated in a dynamic manner based on the number of CCs that are transmitting PUCCH/PUSCH in a slot, and/or on the specific indices of the CCs that are transmitting PUCCH/PUSCH in a slot. However, there may be some drawbacks as a mapping followed by UE 110 may be different from base station 105 if a downlink control information (DCI) grant triggering PUCCH/PUSCH transmissions may have been lost on a downlink transmission from base station 105 to UE 110. The above described drawback, however, may be addressed if the dynamic mapping is used only when all PUCCH/PUSCH transmissions are scheduled by a single DCI as all PUCCH/PUSCH transmissions from UE 110 will not use updated mapping until the updated mapping is received by UE 110 via the single DCI.

Furthermore, at block 250, method 200 may include transmitting, from the UE, the multi-bit SR generated for each group of the plurality of uplink CC groups to the base station. For example, in an aspect, UE 110 and/or multi-bit SR function 142 may include a multi-bit SR transmitting function 150, such as a specially programmed processor module, or a processor executing specially programmed code stored in a memory to transmit BSRs to base station 105. Thus, UE 110 transmits a plurality of BSRs to base station 105.

Figure 3:
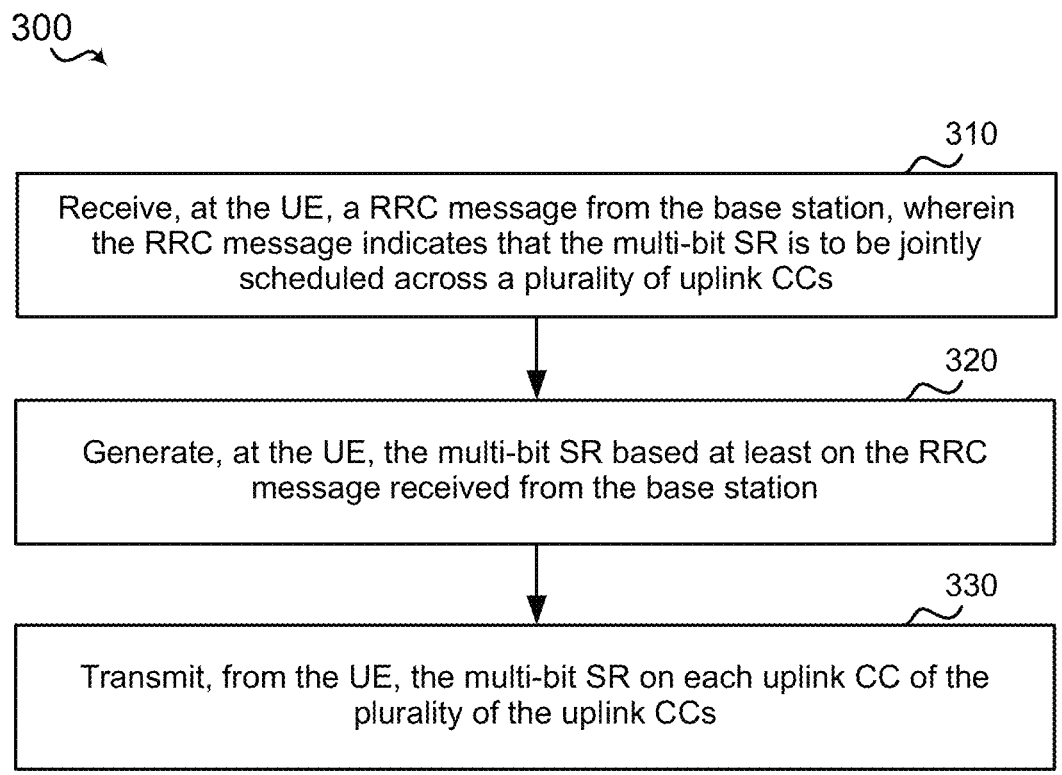
FIG. 3 is a process flow diagram of a method of transmitting a multi-bit SR using different component carriers according to the present disclosure.

FIG. 3 illustrates a flowchart of a method 300 for transmitting a multi-bit SR and/or BSR from a UE in aspects of the present disclosure.

In an aspect, at block 310, methodology 300 may include receiving, at the UE, a RRC message from the base station, wherein the RRC message indicates that the multi-bit SR is to be jointly scheduled across a plurality of uplink component carriers (CCs). For example, in an aspect, UE 110 and/or multi-bit SR function 142 may include a RRC configuration receiving function 144, such as a specially programmed processor module, or a processor executing specially programmed code stored in a memory to receive multi-bit SR configuration information 164 which indicates that the SR, SR+BSR, or BSR to be transmitted from UE 110 is to be jointly scheduled across a plurality of uplink CCs.

In an aspect, at block 320, methodology 300 may include generating, at the UE, the multi-bit SR based at least on the RRC message received from the base station, wherein the generated BSR includes a plurality of bits. For example, in an aspect, UE 110 and/or multi-bit SR function 142 may include a RRC configuration receiving function 144, such as a specially programmed processor module, or a processor executing specially programmed code stored in a memory to generate the BSR, e.g., BSR or SR+SBSR, based at least on multi-bit SR configuration information 164 received from base station 105. For example, multi-bit SR generating function 148 may generate BSR 371 which is jointly encoded over multiple CCs, e.g., CCs, e.g., CC1, CC2, CC3, CC4, and/or CC5. For instance, in one aspect, BSR may be transmitted (e.g. repeated) on all five CCs. This provides for robustness at base station 105 against UL decode failure.

In an additional or optional aspect, UE 110 and/or multi-bit SR generating function 148 may generate a BSR that includes a first part and a second part. The first part may be repeated across all uplink CCs, e.g., all five UL CCs1-5. The second part may be transmitted across a sub-set of uplink CCs, e.g., CC4 and/or CC5. The first part of the BSR that is transmitted (or repeated) on each uplink CC is self-decodable. That is, base station 105 can successfully decode first part based on first part received on just one uplink CC (out of the five uplink CCs in this example). This provides for robustness against UL decode failure at base station 105 for the repeated part (e.g., first part). In a further additional aspect, the parameters associated with repeating of the first part across all uplink CCs and/or splitting of the second part across a sub-set of uplink carries may be sent from base station 105 to UE 110 in a single DCI grant to allowing adapting to load on uplink CCs and/or uplink channel quality, as described above. Additionally, the most significant bits (MSBs), which are considered relatively more important than the least significantly bits (LSBs), may be scheduled on CCs with better uplink channel quality or lower uplink load by the DCI grant.

In an aspect, at block 330, methodology 300 may include transmitting, from the UE, the multi-bit SR on each uplink CC of the plurality of the uplink CCs. For example, in an aspect, UE 110 and/or multi-bit SR function 142 may include a multi-bit SR transmitting function 150, such as a specially programmed processor module, or a processor executing specially programmed code stored in a memory to transmit BSR on each of the CCs. In an additional aspect, UE 110 may transmit the first part of the BSR on each of the uplink CCs, and/or the second part of BSR on CC4 and/or CC5. Thus, UE 110 transmits a BSR, e.g., multiple SRs, SR BSR, BSR etc., to base station 105, which in some aspects, may include a first part and a second part.

Figure 4:
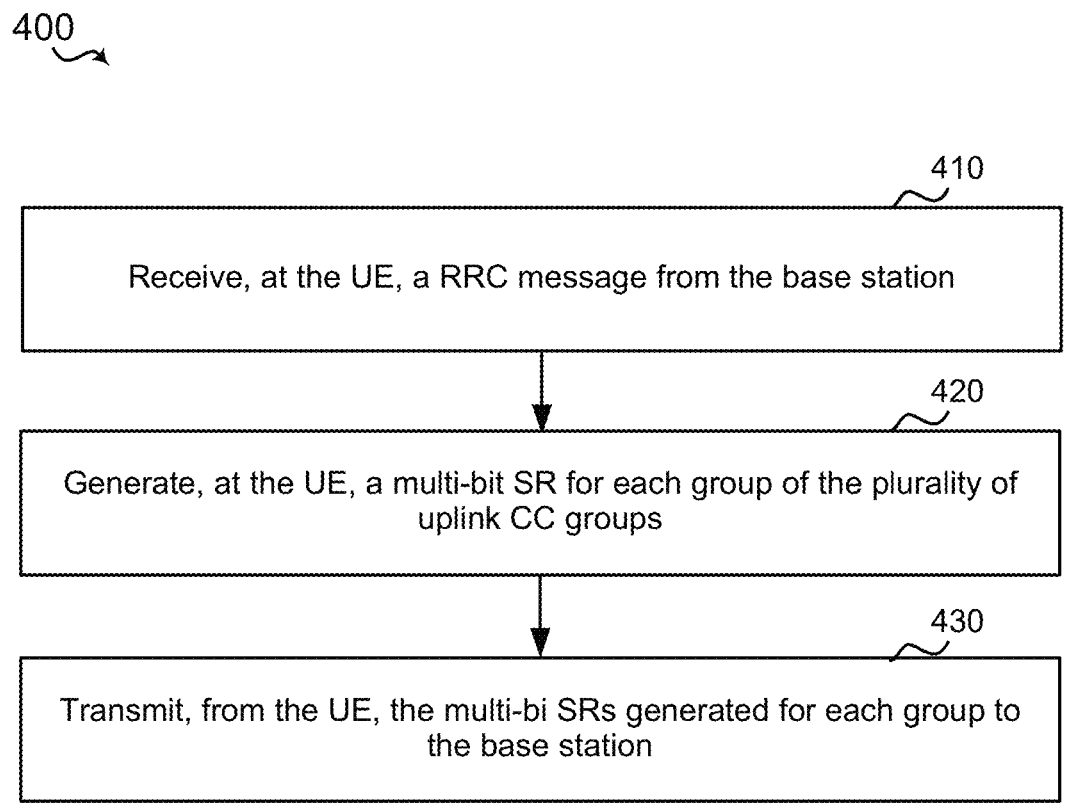
FIG. 4 is a process flow diagram of a method of transmitting multi-bit SR in a hybrid technique according to the present disclosure.

FIG. 4 illustrates a flowchart of a method 400 for transmitting multi-bit SR and/or BSRs from a UE in aspects of the present disclosure.

In an aspect, at block 410, methodology 400 may include receiving, at the UE, a RRC message from the base station, wherein the RRC message indicates that the multi-bit SR is to be jointly scheduled across a plurality of uplink CCs, and that a multi-bit SR of a CC group is to be jointly scheduled across a plurality of CCs of the respective CC group. For example, in an aspect, UE 110 and/or multi-bit SR function 142 may include a RRC configuration receiving function 144, such as a specially programmed processor module, or a processor executing specially programmed code stored in a memory to receive multi-bit SR configuration information 164. The multi-bit SR configuration information 164 indicates to UE 110 that uplink CCs are assigned to a plurality of uplink CC groups, as described above in detail in reference to FIG. 2, and that the BSR is to be jointly scheduled across a plurality of uplink CCs, as described above in detail in reference to FIG. 3.

In an aspect, at block 420, methodology 400 may generating, at the UE, a multi-bit SR for each group of the plurality of uplink CC groups, wherein the generated multi-bit SR includes a plurality of bits, and wherein the multi-bit SR includes a first and a second part, and wherein the multi-bit SR is jointly scheduled across a sub-set of the uplink CCs associated with the corresponding uplink CC group. For example, in an aspect, UE 110 and/or multi-bit SR function 142 may include a multi-bit SR generating function 148, such as a specially programmed processor module, or a processor executing specially programmed code stored in a memory to generate a BSR for each group, as described above in detail in reference to FIGS. 2 and 3.

In an aspect, at block 430, methodology 400 may include transmitting, from the UE, the multi-bit SRs generated for each group to the base station. For example, in an aspect, UE 110 and/or multi-bit SR function 142 may include a multi-bit SR transmitting function 150, such as a specially programmed processor module, or a processor executing specially programmed code stored in a memory to transmit the multi-bit SRs generated for each group to the base station 105. Thus, UE 110 may transmit BSRs, over a separate group of carriers using encoding across uplink CCs within that group as described above in reference to FIG. 3 above. For example, BSR may be sent/transmitted over a separate group of carriers, e.g., CC1 and/or CC2 of Group1. Additionally, BSR may be sent/transmitted over a separate group of carriers, e.g., CC4 and/or CC5 of Group2.

In the above methodologies described above, multiple transmissions over multiple uplink CCs over which a BSR is independently or jointly encoded do not have to be simultaneous in time. For example, PUCCH duration, or PUSCH mini-slot (partial slot) duration may be different in different uplink CC, and may result in a partial overlap in time domain. Further, the transmissions may be in in different slots. Furthermore, base station 105 and UE 110 must be in agreement (or in sync) regarding the slots over which a BSR is jointly encoded for transmitting to base station 105. This may be ensured if all the transmissions are triggered by a single DCI or configured in a semi-static manner. Further, the uplink CCs may be aggregated at different upper layers, e.g., a MAC layer, similar to LTE carrier aggregation, or at packet data convergence protocol (PDCP) layer, like LTE dual-connectivity.

Figure 5:
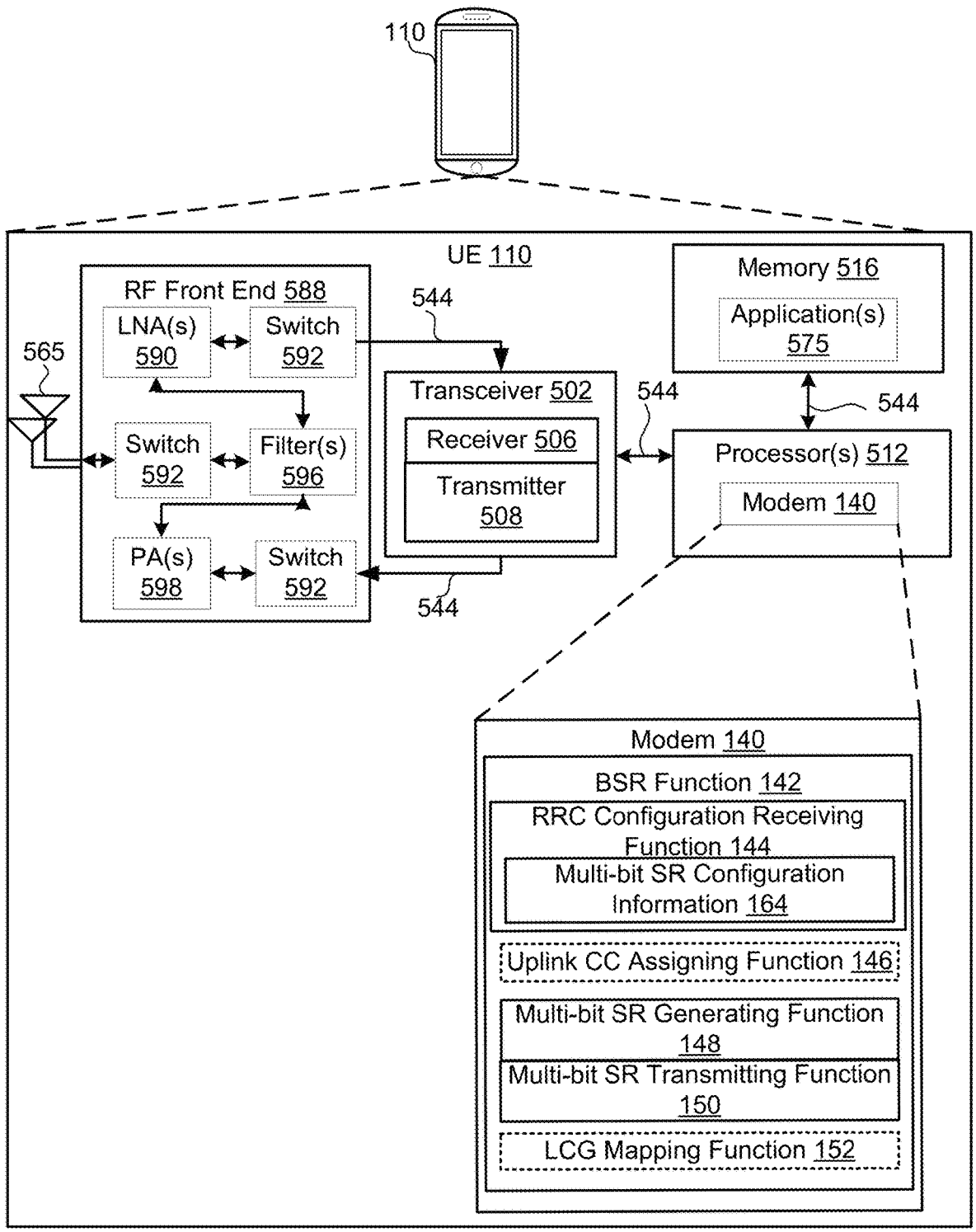
FIG. 5 is a schematic diagram of example components of the UE of FIG. 1.

Referring to FIG. 5, one example of an implementation of UE 110 may include a variety of components, some of which have already been described above, but including components such as one or more processors 512 and memory 516 and transceiver 502 in communication via one or more buses 544, which may operate in conjunction with modem 140.

Further, the one or more processors 512, modem 140, memory 516, transceiver 502, RF front end 588 and one or more antennas 565, may be configured to support voice and/or data calls (simultaneously or non-simultaneously) in one or more radio access technologies.

In an aspect, the one or more processors 512 can include a modem 140 that uses one or more modem processors. The various functions related to transmission of multi-bit SR may be included in modem 140 and/or processors 512 and, in an aspect, can be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with transceiver 502. In other aspects, some of the features of the one or more processors 512 and/or modem 140 associated with multi-bit SR transmission may be performed by transceiver 502.

Also, memory 516 may be configured to store data used herein and/or local versions of applications 575 being executed by at least one processor 512. Memory 516 can include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, memory 516 may be a non-transitory computer-readable storage medium that stores one or more computer-executable codes, and/or data associated therewith, when UE 110 is operating at least one processor 512 to execute multi-bit SR function 142, RRC configuration receiving function 144, uplink CC assigning function 146, multi-bit SR generating function 148, multi-bit SR transmitting function 150, and/or LCG mapping function 152.

Transceiver 502 may include at least one receiver 506 and at least one transmitter 508. Receiver 506 may include hardware, firmware, and/or software code executable by a processor for receiving data, the code comprising instructions and being stored in a memory (e.g., computer-readable medium). Receiver 506 may be, for example, a radio frequency (RF) receiver. In an aspect, receiver 506 may receive signals transmitted by at least one base station 105. Additionally, receiver 506 may process such received signals, and also may obtain measurements of the signals, such as, but not limited to, Ec/Io, SNR, RSRP, RSSI, etc. Transmitter 508 may include hardware, firmware, and/or software code executable by a processor for transmitting data, the code comprising instructions and being stored in a memory (e.g., computer-readable medium). A suitable example of transmitter 508 may including, but is not limited to, an RF transmitter.

Moreover, in an aspect, UE 110 may include RF front end 588, which may operate in communication with one or more antennas 565 and transceiver 502 for receiving and transmitting radio transmissions, for example, wireless communications transmitted by at least one base station 105 or wireless transmissions transmitted by UE 110. RF front end 588 may be connected to one or more antennas 565 and can include one or more low-noise amplifiers (LNAs) 590, one or more switches 592, one or more power amplifiers (PAs) 598, and one or more filters 596 for transmitting and receiving RF signals.

In aspect, LNA 590 can amplify a received signal at a desired output level. In an aspect, each LNA 590 may have a specified minimum and maximum gain values. In an aspect, RF front end 588 may use one or more switches 592 to select a particular LNA 590 and its specified gain value based on a desired gain value for a particular application.

Further, for example, one or more PA(s) 598 may be used by RF front end 588 to amplify a signal for an RF output at a desired output power level. In an aspect, each PA 598 may have specified minimum and maximum gain values. In an aspect, RF front end 588 may use one or more switches 592 to select a particular PA 598 and its specified gain value based on a desired gain value for a particular application.

Also, for example, one or more filters 596 can be used by RF front end 588 to filter a received signal to obtain an input RF signal. Similarly, in an aspect, for example, a respective filter 596 can be used to filter an output from a respective PA 598 to produce an output signal for transmission. In an aspect, each filter 596 can be connected to a specific LNA 590 and/or PA 598. In an aspect, RF front end 588 can use one or more switches 592 to select a transmit or receive path using a specified filter 596, LNA 590, and/or PA 598, based on a configuration as specified by transceiver 502 and/or processor 512.

As such, transceiver 502 may be configured to transmit and receive wireless signals through one or more antennas 565 via RF front end 588. In an aspect, transceiver may be tuned to operate at specified frequencies such that UE 110 can communicate with, for example, one or more base stations 105 or one or more cells associated with one or more base stations 105. In an aspect, for example, modem 140 can configure transceiver 502 to operate at a specified frequency and power level based on the UE configuration of the UE 110 and the communication protocol used by modem 140.

In an aspect, modem 140 can be a multiband-multimode modem, which can process digital data and communicate with transceiver 502 such that the digital data is sent and received using transceiver 502. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 588, transceiver 502) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 6:
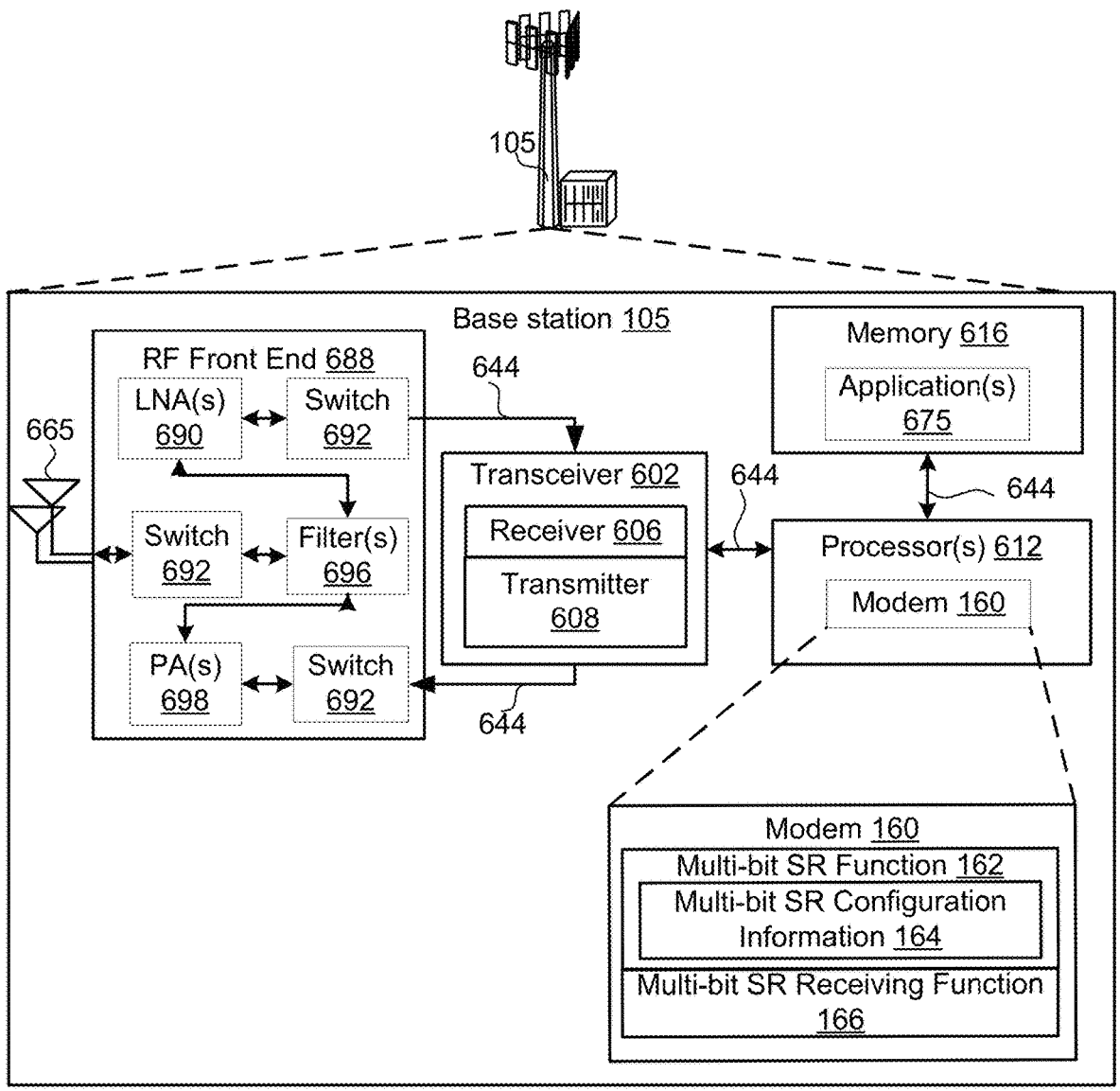
FIG. 6 is a schematic diagram of example components of the base station of FIG. 1.

Referring to FIG. 6, one example of an implementation of base station 105 may include a variety of components, some of which have already been described above, but including components such as one or more processors 612 and memory 616 and transceiver 602 in communication via one or more buses 644, which may operate in conjunction with modem 160. Further, the one or more processors 612, modem 160, memory 616, transceiver 602, RF front end 688 and one or more antennas 665, may be configured to support voice and/or data calls (simultaneously or non-simultaneously) in one or more radio access technologies.

In an aspect, the one or more processors 612 can include a modem 160 that uses one or more modem processors. The various functions related to multi-bit SR configuration may be included in modem 160 and/or processors 612 and, in an aspect, can be executed by a single processor, while in other aspects, different ones of the functions may be executed by a combination of two or more different processors. For example, in an aspect, the one or more processors 612 may include any one or any combination of a modem processor, or a baseband processor, or a digital signal processor, or a transmit processor, or a receiver processor, or a transceiver processor associated with transceiver 602. In other aspects, some of the features of the one or more processors 612 and/or modem 160 associated with subcarrier spacing configuration may be performed by transceiver 602.

Also, memory 616 may be configured to store data used herein and/or local versions of applications 675 being executed by at least one processor 612. Memory 616 can include any type of computer-readable medium usable by a computer or at least one processor 612, such as random access memory (RAM), read only memory (ROM), tapes, magnetic discs, optical discs, volatile memory, non-volatile memory, and any combination thereof. In an aspect, for example, memory 616 may be a non-transitory computer-readable storage medium that stores one or more computer-executable codes, and/or data associated therewith, when UE 110 is operating at least one processor 612 to execute multi-bit SR function 162 and/or multi-bit SR receiving function 166.

Transceiver 602 may include at least one receiver 606 and at least one transmitter 608. Receiver 606 may include hardware, firmware, and/or software code executable by a processor for receiving data, the code comprising instructions and being stored in a memory (e.g., computer-readable medium). Receiver 606 may be, for example, a radio frequency (RF) receiver. In an aspect, receiver 606 may receive signals transmitted by at least one base station 105. Additionally, receiver 606 may process such received signals, and also may obtain measurements of the signals, such as, but not limited to, Ec/Io, SNR, RSRP, RSSI, etc. Transmitter 608 may include hardware, firmware, and/or software code executable by a processor for transmitting data, the code comprising instructions and being stored in a memory (e.g., computer-readable medium). A suitable example of transmitter 608 may including, but is not limited to, an RF transmitter.

Moreover, in an aspect, UE 110 may include RF front end 688, which may operate in communication with one or more antennas 665 and transceiver 602 for receiving and transmitting radio transmissions, for example, wireless communications transmitted by at least one base station 105 or wireless transmissions transmitted by UE 110. RF front end 688 may be connected to one or more antennas 665 and can include one or more low-noise amplifiers (LNAs) 690, one or more switches 692, one or more power amplifiers (PAs) 698, and one or more filters 696 for transmitting and receiving RF signals.

In an aspect, LNA 690 can amplify a received signal at a desired output level. In an aspect, each LNA 690 may have a specified minimum and maximum gain values. In an aspect, RF front end 688 may use one or more switches 692 to select a particular LNA 690 and its specified gain value based on a desired gain value for a particular application.

Further, for example, one or more PA(s) 698 may be used by RF front end 688 to amplify a signal for an RF output at a desired output power level. In an aspect, each PA 698 may have specified minimum and maximum gain values. In an aspect, RF front end 688 may use one or more switches 692 to select a particular PA 698 and its specified gain value based on a desired gain value for a particular application.

Also, for example, one or more filters 696 can be used by RF front end 688 to filter a received signal to obtain an input RF signal. Similarly, in an aspect, for example, a respective filter 696 can be used to filter an output from a respective PA 698 to produce an output signal for transmission. In an aspect, each filter 696 can be connected to a specific LNA 690 and/or PA 698. In an aspect, RF front end 688 can use one or more switches 692 to select a transmit or receive path using a specified filter 696, LNA 690, and/or PA 698, based on a configuration as specified by transceiver 602 and/or processor 612.

As such, transceiver 602 may be configured to transmit and receive wireless signals through one or more antennas 665 via RF front end 688. In an aspect, transceiver may be tuned to operate at specified frequencies such that UE 110 can communicate with, for example, one or more base stations 105 or one or more cells associated with one or more base stations 105. In an aspect, for example, modem 160 can configure transceiver 602 to operate at a specified frequency and power level based on the UE configuration of the UE 110 and the communication protocol used by modem 160.

In an aspect, modem 160 can be a multiband-multimode modem, which can process digital data and communicate with transceiver 602 such that the digital data is sent and received using transceiver 602. In an aspect, modem 160 can be multiband and be configured to support multiple frequency bands for a specific communications protocol. In an aspect, modem 160 can be multimode and be configured to support multiple operating networks and communications protocols. In an aspect, modem 140 can control one or more components of UE 110 (e.g., RF front end 688, transceiver 602) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of transmitting multi-bit scheduling requests (SRs) from a user equipment (UE); comprising:
   receiving, at the UE, a radio resource control (RRC) message from a first base station, wherein the RRC message indicates that uplink component carriers (CCs) of the UE are to be assigned to a plurality of uplink CC groups, wherein the plurality of uplink CC groups includes a first uplink CC group and a second uplink CC group;
   assigning the uplink CCs to the plurality of uplink CC groups;
   generating, at the UE, a plurality of multi-bit SRs including a multi-bit SR for each group of the plurality of uplink CC groups, including a first multi-bit SR for the first uplink CC group and a second multi-bit SR for the second uplink CC group, wherein a first number of bits of the first multi-bit SR is different from a second number of bits of the second multi-bit SR;
   mapping each logical channel of a plurality of logical channels at the UE to at least one uplink CC of the plurality of uplink CCs; and
   transmitting, from the UE, at least one of the plurality of multi-bit SRs generated for a group of the plurality of uplink CC groups.

2. The method of claim 1, wherein the mapping is updated in a semi-static manner or a dynamic manner.

3. The method of claim 2, wherein the mapping is updated in the semi-static manner via a second RRC message.

4. The method of claim 1, further comprising:
   dynamically updating, at the UE, a number of bits of the multi-bit SR based on one or more of an assigned physical uplink control channel (PUCCH), a PUCCH format, a PUCCH assignment size, or types of other uplink control information (UCI) payloads multiplexed together with the multi-bit SR on PUCCH, or sizes of other uplink control information (UCI) payloads multiplexed together with the multi-bit SR on PUCCH, or any combination thereof.

5. The method of claim 1, wherein a size of the multi-bit SR is represented by a function $$X=\mathrm{ceil}(\log 2(K+1))$$

wherein K is a number of physical uplink control channel (PUCCH) resources and X is a number of SR bits.

6. The method of claim 5, wherein the K PUCCH resources are ordered in increasing size of corresponding SR resources, and wherein an index of an ordered PUCCH resource ID is obtained from X bits when SR is triggered.

7. The method of claim 1, wherein the multi-bit SR includes a buffer status report (BSR).

8. A user equipment (UE); comprising:
   a memory having instructions;
   a transceiver; and
   one or more processors communicatively coupled with the memory and the transceiver, the one or more processors are configured to execute the instructions to:
      receive, via the transceiver, at the UE, a radio resource control (RRC) message from a first base station, wherein the RRC message indicates that uplink component carriers (CCs) of the UE are to be assigned to a plurality of uplink CC groups, wherein the plurality of uplink CC groups includes a first uplink CC group and a second uplink CC group;

assign the uplink CCs to the plurality of uplink CC groups;

generate, at the UE, a plurality of multi-bit SRs including a multi-bit SR for each group of the plurality of uplink CC groups, including a first multi-bit SR for the first uplink CC group and a second multi-bit SR for the second uplink CC group, wherein a first number of bits of the first multi-bit SR is different from a second number of bits of the second multi-bit SR;

map each logical channel of a plurality of logical channels at the UE to at least one uplink CC of the plurality of uplink CCs; and transmit, via the transceiver, from the UE, at least one of the plurality of multi-bit SRs generated for a group of the plurality of uplink CC groups.

9. The UE of claim 8, wherein the mapping is updated in a semi-static manner or a dynamic manner.

10. The UE of claim 9, wherein the mapping is updated in the semi-static manner via a second RRC message.

11. The UE of claim 8, wherein the one or more processors are further configured to:

dynamically update, at the UE, a number of bits of the multi-bit SR based on one or more of an assigned physical uplink control channel (PUCCH), a PUCCH format, a PUCCH assignment size, or types of other uplink control information (UCI) payloads multiplexed together with the multi-bit SR on PUCCH, or sizes of other uplink control information (UCI) payloads multiplexed together with the multi-bit SR on PUCCH, or any combination thereof.

12. The UE of claim 8, wherein a size of the multi-bit SR is represented by a function $$X=\text{ceil}(\log2(K+1))$$

wherein K is a number of physical uplink control channel (PUCCH) resources and X is a number of SR bits.

13. The UE of claim 12, wherein the K PUCCH resources are ordered in increasing size of corresponding SR resources, and wherein an index of an ordered PUCCH resource ID is obtained from X bits when SR is triggered.

14. The UE of claim 8, wherein the multi-bit SR includes a buffer status report (BSR).

15. A user equipment (UE); comprising:

means for receiving, at the UE, a radio resource control (RRC) message from a first base station, wherein the RRC message indicates that uplink component carriers (CCs) of the UE are to be assigned to a plurality of uplink CC groups, wherein the plurality of uplink CC groups includes a first uplink CC group and a second uplink CC group;

means for assigning the uplink CCs to the plurality of uplink CC groups;

means for generating, at the UE, a plurality of multi-bit SRs including a multi-bit SR for each group of the plurality of uplink CC groups, including a first multi-bit SR for the first uplink CC group and a second multi-bit SR for the second uplink CC group, wherein a first number of bits of the first multi-bit SR is different from a second number of bits of the second multi-bit SR;

means for mapping each logical channel of a plurality of logical channels at the UE to at least one uplink CC of the plurality of uplink CCs; and means for transmitting, from the UE, at least one of the plurality of multi-bit SRs generated for a group of the plurality of uplink CC groups.

16. The UE of claim 15, wherein the mapping is updated in a semi-static manner or a dynamic manner.

17. The UE of claim 16, wherein the mapping is updated in the semi-static manner via a second RRC message.

18. The UE of claim 15, further comprising:

means for dynamically updating, at the UE, a number of bits of the multi-bit SR based on one or more of an assigned physical uplink control channel (PUCCH), a PUCCH format, a PUCCH assignment size, or types of other uplink control information (UCI) payloads multiplexed together with the multi-bit SR on PUCCH, or sizes of other uplink control information (UCI) payloads multiplexed together with the multi-bit SR on PUCCH, or any combination thereof.

19. The UE of claim 15, wherein a size of the multi-bit SR is represented by a function $$X=\text{ceil}(\log2(K+1))$$

wherein K is a number of physical uplink control channel (PUCCH) resources and X is a number of SR bits.

20. The UE of claim 19, wherein the K PUCCH resources are ordered in increasing size of corresponding SR resources, and wherein an index of an ordered PUCCH resource ID is obtained from X bits when SR is triggered.

21. The UE of claim 15, wherein the multi-bit SR includes a buffer status report (BSR).

22. A non-transitory computer readable medium including instructions that, when executed by one or more processors of a user equipment (UE), cause the one or more processors to:

receive, at the UE, a radio resource control (RRC) message from a first base station, wherein the RRC message indicates that uplink component carriers (CCs) of the UE are to be assigned to a plurality of uplink CC groups, wherein the plurality of uplink CC groups includes a first uplink CC group and a second uplink CC group;

assign the uplink CCs to the plurality of uplink CC groups;

generate, at the UE, a plurality of multi-bit SRs including a multi-bit SR for each group of the plurality of uplink CC groups, including a first multi-bit SR for the first uplink CC group and a second multi-bit SR for the second uplink CC group, wherein a first number of bits of the first multi-bit SR is different from a second number of bits of the second multi-bit SR;

map each logical channel of a plurality of logical channels at the UE to at least one uplink CC of the plurality of uplink CCs; and transmit, from the UE, at least one of the plurality of multi-bit SRs generated for a group of the plurality of uplink CC groups.

23. The non-transitory computer readable medium of claim 22, wherein the mapping is updated in a semi-static manner or a dynamic manner.

24. The non-transitory computer readable medium of claim 23, wherein the mapping is updated in the semi-static manner Nia a second RRC message.

25. The non-transitory computer readable medium of claim 22, further comprises instructions that cause the one or more processors to:

dynamically update, at the UE, a number of bits of the multi-bit SR based on one or more of an assigned physical uplink control channel (PUCCH), a PUCCH format, a PUCCH assignment size, or types of other uplink control information (UCI) payloads multiplexed together with the multi-bit SR on PUCCH, or sizes of other uplink control information (UCI) payloads multiplexed together with the multi-bit SR on PUCCH, or any combination thereof.

26. The non-transitory computer readable medium of claim 22, wherein a size of the multi-bit SR is represented by a function $$X = \mathrm{ceil}(\log 2(K+1))$$

wherein K is a number of physical uplink control channel (PUCCH) resources and X is a number of SR bits.

27. The non-transitory computer readable medium of claim 26, wherein the K PUCCH resources are ordered in increasing size of corresponding SR resources, and wherein an index of an ordered PUCCH resource ID is obtained from X bits when SR is triggered.

28. The non-transitory computer readable medium of claim 22, wherein the multi-bit SR includes a buffer status report (BSR).

\* \* \* \* \*